US007697067B2

(12) United States Patent
Lim et al.

(10) Patent No.: US 7,697,067 B2
(45) Date of Patent: Apr. 13, 2010

(54) DIGITAL VIDEO PROCESSING SYSTEMS AND METHODS FOR ESTIMATING HORIZONTAL SYNC IN DIGITAL VIDEO SIGNALS

(75) Inventors: Kyoung-mook Lim, Hwaseong-si (KR); Heo-jin Byeon, Hwaseong-si (KR); Hyung-jun Lim, Suwon-si (KR); Seh-woong Jeong, Seoul (KR); Jae-hong Park, Seongnam-si (KR); Sung-cheol Park, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1051 days.

(21) Appl. No.: 11/297,118

(22) Filed: Dec. 8, 2005

(65) Prior Publication Data

US 2006/0170821 A1    Aug. 3, 2006

(30) Foreign Application Priority Data

Dec. 20, 2004  (KR) ............... 10-2004-0108822

(51) Int. Cl.
*H03L 7/00* (2006.01)
*H04N 9/45* (2006.01)
*H04N 9/455* (2006.01)
*H04N 9/475* (2006.01)
*H04N 5/06* (2006.01)

(52) U.S. Cl. .................. 348/540; 348/541; 348/542; 348/512; 348/521

(58) Field of Classification Search ......... 348/540–544, 348/512, 521–522
See application file for complete search history.

(56) References Cited

U.S. PATENT DOCUMENTS

| 3,860,952 | A | * | 1/1975 | Tallent et al. ............... 348/498 |
|---|---|---|---|---|
| 4,597,021 | A | * | 6/1986 | Yamamitsu et al. ........... 386/9 |
| 5,497,361 | A | * | 3/1996 | Mita et al. ............... 369/47.18 |
| 5,548,570 | A | * | 8/1996 | Hirajima et al. .......... 369/59.16 |
| 5,570,335 | A | * | 10/1996 | Ogata et al. ........... 369/124.05 |
| 5,748,830 | A | * | 5/1998 | Jang ........................... 386/22 |
| 5,767,916 | A | * | 6/1998 | West ......................... 348/537 |
| 5,828,366 | A | * | 10/1998 | Hurst ........................ 345/204 |
| 5,835,155 | A | * | 11/1998 | Jennes et al. ............... 348/536 |
| 5,844,622 | A | * | 12/1998 | Hulvey ...................... 348/546 |
| 6,271,889 | B1 | * | 8/2001 | Bohm et al. ................ 348/531 |
| 6,380,980 | B1 | * | 4/2002 | Huang ....................... 348/505 |
| 6,665,019 | B1 | * | 12/2003 | Pronkine ................... 348/540 |
| 6,704,009 | B2 | * | 3/2004 | Tachibana et al. .......... 345/213 |
| 6,721,888 | B1 | * | 4/2004 | Liu et al. ................... 713/191 |
| 6,741,291 | B1 | * | 5/2004 | Tsubaki ..................... 348/533 |
| 6,882,360 | B2 | * | 4/2005 | Zeidler ...................... 348/194 |
| 7,176,979 | B2 | * | 2/2007 | Bohm et al. ............... 348/531 |
| 7,327,399 | B2 | * | 2/2008 | O'Connell ................. 348/465 |
| 2003/0048386 | A1 | * | 3/2003 | Zeidler ...................... 348/691 |

(Continued)

*Primary Examiner*—Brian P Yenke
(74) *Attorney, Agent, or Firm*—F. Chau & Associates, LLC

(57) ABSTRACT

Video signal processing systems and methods for detecting horizontal synchronization signals within video signals. Digital filtering methods are implemented for processing analog video signals to determine time varying characteristics of video signals to detect the starting and ending positions of horizontal synchronization pulses in a video signal with increased accuracy. In addition, adaptive methods are implemented for dynamically determining various video signal parameters over time, such as blanking level BL, threshold value (slice) level and synchronization level SL using information extracted from digitally filtered video signals.

26 Claims, 6 Drawing Sheets

U.S. PATENT DOCUMENTS

| | | |
|---|---|---|
| 2005/0052577 A1* | 3/2005 | Seth-Smith et al. ......... 348/542 |
| 2005/0174487 A1* | 8/2005 | O'Connell .................. 348/525 |
| 2005/0212970 A1* | 9/2005 | Joskin ........................ 348/572 |
| 2006/0077288 A1* | 4/2006 | Wu ............................ 348/441 |

* cited by examiner

DIGITAL VIDEO PROCESSING SYSTEMS AND METHODS FOR ESTIMATING HORIZONTAL SYNC IN DIGITAL VIDEO SIGNALS

CROSS-REFERENCE TO RELATED APPLICATION

This application claims priority to Korean Patent Application No. 10-2004-0108822, filed on Dec. 20, 2004, which is incorporated herein by reference.

TECHNICAL FIELD OF THE INVENTION

The present invention relates generally to video signal processing systems and methods and, in particular, to systems and methods for detecting horizontal synchronization signals within video signals.

BACKGROUND

In general, a video signal is a low voltage signal that contains intensity information in combination with timing information, which is used to drive a display system. A video signal comprises a plurality of video frames, wherein a vertical synchronization (or Vsync) pulse is generated at the end of each video frame. Each video frame comprises a plurality of lines which contain video information that is processed for driving lines of a screen or monitor, for example.

FIG. 1 schematically illustrates an analog video signal (10), in particular, a color video burst signal (CVBS). The analog video signal (10) comprises front porch (11) portions, horizontal synchronization (Hsync) pulses (12), back porch (12) portions that contain a color burst signal (13a), and active video signal (14) portions. The Hsync pulses (12) identify the beginning of each line of video information. Each Hsync pulse (12) is preceded by a front porch (11) and terminated by a back porch (13). The color burst signal (13a) is utilized in various video formats (e.g., NTSC and PAL) as a color calibration reference. An active video signal (14) is located between the back porch (13) and the front porch (11) of a next Hsync pulse (12).

Each line of the video signal (10) begins at a falling edge of a Hsync pulse (12) and ends at a falling edge of the next Hsync pulse (12). The front porch (11) and back porch (13) are at a DC voltage level referred to as a "blanking level", BL (e.g., 0V), which is specified based on the given video standard. The Hsync pulses (12) have a DC voltage level (or amplitude) referred to as the "synchronization level", SL, which has a DC level less than the BL. The falling and rising edges of an Hsync pulse (12) are defined based on a DC slice level, which is typically specified as 50% of the Hsync pulse amplitude, or SL, relative to the BL. The distance between the back porch (13) and a front porch (11) of a given line of video is a parameter that is specified based on the given video signal standard.

Various types of video processing systems and methods have been developed for processing video signals (such as depicted in FIG. 1) to extract video and timing information that is used for driving a display system. One important aspect of video processing is the ability to accurately detect the Vsync and Hsync signals for properly identifying separate frames and properly generating and displaying the line information of each video frame. FIG. 2A is a high-level block diagram that schematically illustrates a conventional video signal processing system (100). In general, the video processing system (100) comprises a Y/C separator module (110), a synchronization detector module (120) and a demodulator module (130).

The sync detector module (20) detects Hsync and Vsync of an input video signal (10). The Y/C separator (110) separates luminance Y and chrominance C signals from the input video signal (10) based on the Sync signals detected by the Sync detector (120). The demodulator (130) interpolates the extracted Y and C signals and generates video data signals (R,G,B/Y,Cb,Cr) that are further processed by a video processing unit to generate control signals for driving a display device to display a video picture.

FIG. 2B is a block diagram that schematically illustrates a conventional embodiment of the Sync detector module (120) for detecting Hsync signals of an input video signal. The detector (120) comprises a slicer module (121), a slice level generator (122), a phase detector (123), and a PLL (phase-locked loop) (124), which all operate under control of a controller (125). In general, the slicer (121) detects the rising and falling edges of Hsync signals in the input video signal (10) based on a DC slice level that is generated by the slice level generator (122). The slice level generator (122) processes the input video signal (10) to determine a DC slice level using known techniques. For instance, a DC slice level can be determined based on a priori knowledge of the DC amplitudes, transitions, and structures of various portions of the input video signal. A DC slice level can be determined based on estimates of relative amplitudes between the SL of the Hsync pulse and other levels such as BL or the peak of the active video portions.

Based on the DC slice level determined by the slice level generator (122), the slicer module (121) will detect the falling edges of Hsync pulses (12) in the video signal (10) at points where the input video signal level moves below the determined DC slice level. Similarly, the slicer module (121) will detect the rising edges of Hsync pulses (12) in the video signal (10) at points where the input video signal level moves above the determined DC slice level.

The PLL (124) operates to generate and output control pulses (Hsync) that are synchronized to the detected Hsync pulses in the input video signal (10). The phase detector (123) determines an amount of phase difference between the Hsync pulses extracted from the video signal (10) by the slicer (121) and the Sync pulses generated and output from the PLL (124). The phase detector (123) will generate a control signal based on the detected phase difference, which causes the PLL (124) to perform error correction to adjust the output Sync pulses to be phase aligned to the extracted Hsync pulses.

Depending on the type of Hsync detections employed, the conventional system of FIGS. 2A/2B can exhibit degraded performance due to decreased Hsync detection accuracy. In particular, for Hsync detection methods that are based on comparing the DC levels of the video signal to known or determined threshold amplitudes (e.g., BL, SL, etc.), accurate detection of the HSync may not be possible when the video signal is noisy. In addition, the transmission of a video signal can lead to distortion or loss of the DC levels of the input video signal, thus, making is difficult or impossible to detect the Hsync pulses.

SUMMARY OF THE INVENTION

Exemplary embodiments of the invention generally include video signal processing systems and methods for detecting horizontal synchronization signals within video signals. In one exemplary embodiment of the invention, a method is provided for processing a video signal comprising a horizontal sync signal. The analog video signal is converted to a digital video signal. The digital video signal is then low-pass filtered to generate a first filtered digital video signal. The first filtered digital video signal is then high-pass filtered to generate a second filtered digital video signal. The first and second filtered digital video signals are processed to determine the position of the horizontal sync signal for one or more line scan periods.

In other exemplary embodiments of the invention, a sync level (SL) of the horizontal sync signal is estimated using the first filtered digital video signal and the determined position of the horizontal sync signal. Further, a blank level (BL) of the analog video signal is estimated using the first filtered digital video signal and the determined position of the horizontal sync signal. In addition, a threshold value (THV) is estimated using the estimated SL and BL and the estimated THV is used for determining the position of the horizontal sync signal.

In another exemplary embodiment of the invention, the position of the horizontal sync signal is determined by generating a masking signal indicating an estimated interval of the horizontal sync signal using the first filtered video signal, and determining a start position $i_{start}$ and end position $i_{end}$ of the horizontal sync signal using the masking signal and the second filtered digital video signal. In addition, an adjusted start position can be determined by interpolating the second filtered digital video signal in an interval of samples including the determined start position $i_{start}$.

In one exemplary embodiment of the invention, the SL is estimated by determining an average of sample values of the first filtered digital video signal within each of a plurality of sample intervals between the start position $i_{start}$ and end position $i_{end}$ of the horizontal sync signal, and then determining one of the plurality of sample intervals having a minimum average value. The minimum average value is output as the estimated SL.

In yet another exemplary embodiment, the BL is estimated by determining an average of N sample values in a back porch region of the first filtered digital video signal after the determined end position $i_{end}$ of the horizontal sync signal. The average of N sample values is output as the estimated BL. In another exemplary embodiment of the invention, a plurality of sample values immediately following the determined end position $i_{end}$ are excluded and not used for estimating the BL.

These and other exemplary embodiments, aspects, objects, features and advantages of the present invention will become apparent from the following detailed description of exemplary embodiments, which is to be read in connection with the accompanying drawings.

DETAILED DESCRIPTION OF EXEMPLARY EMBODIMENTS

Exemplary embodiments of systems and methods for detecting horizontal synchronization in video signals will now be described in further detail. It is to be understood that the exemplary systems and methods described herein may be implemented in various forms of hardware, software, firmware, special purpose processors, or a combination thereof. In one exemplary embodiment, video processing systems and methods can be implemented in software comprising program instructions that are tangibly embodied on one or more program storage devices (e.g., hard disk, magnetic floppy disk, RAM, CD Rom, DVD, ROM, flash memory, etc.), and executable by any device or machine comprising suitable architecture (e.g., microprocessor, DSP, ASIC, FPGA, etc.).

Figure 3:
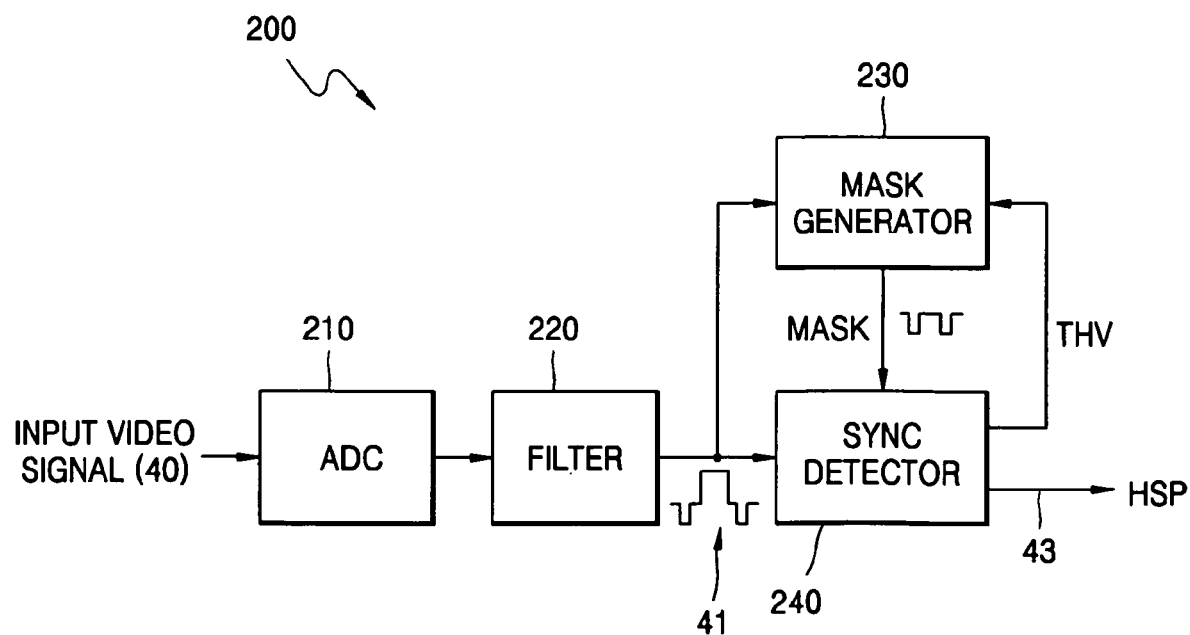
FIG. 3 is a high-level block diagram of an Hsync detection system according to an exemplary embodiment of the invention.

FIG. 3 is a block diagram that schematically illustrates a system (200) for detecting horizontal synchronization (Hsync) signals of a video signal, according to an exemplary embodiment of the invention. In general, the system comprises an ADC (analog-to-digital converter) (210), a digital filter (220), a mask generator (230), and an Hsync detector (240). An exemplary mode of operation of the overall system (200) and functions of the constituent system components will be described with reference to the waveform timing diagram of FIG. 4.

Figure 1:
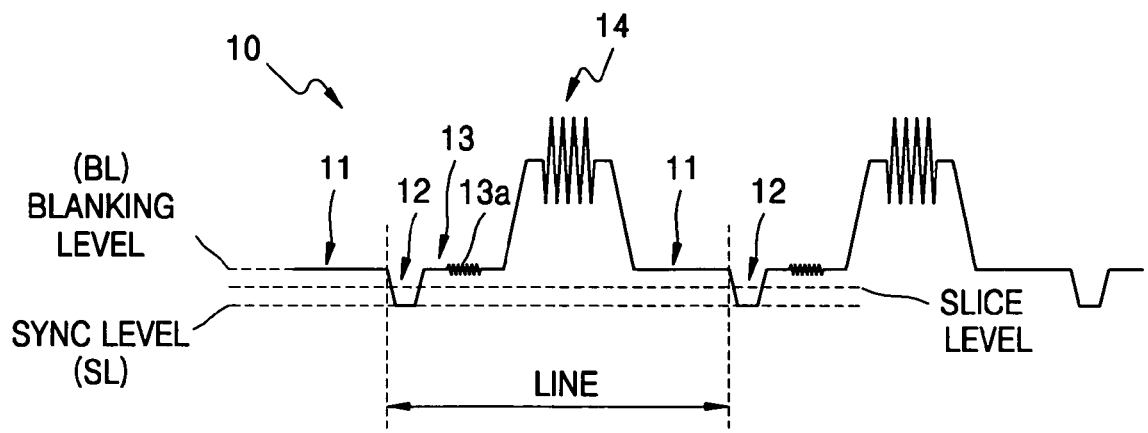
FIG. 1 schematically illustrates a video signal having a conventional format based on a video signal standard.
Figure 2A:
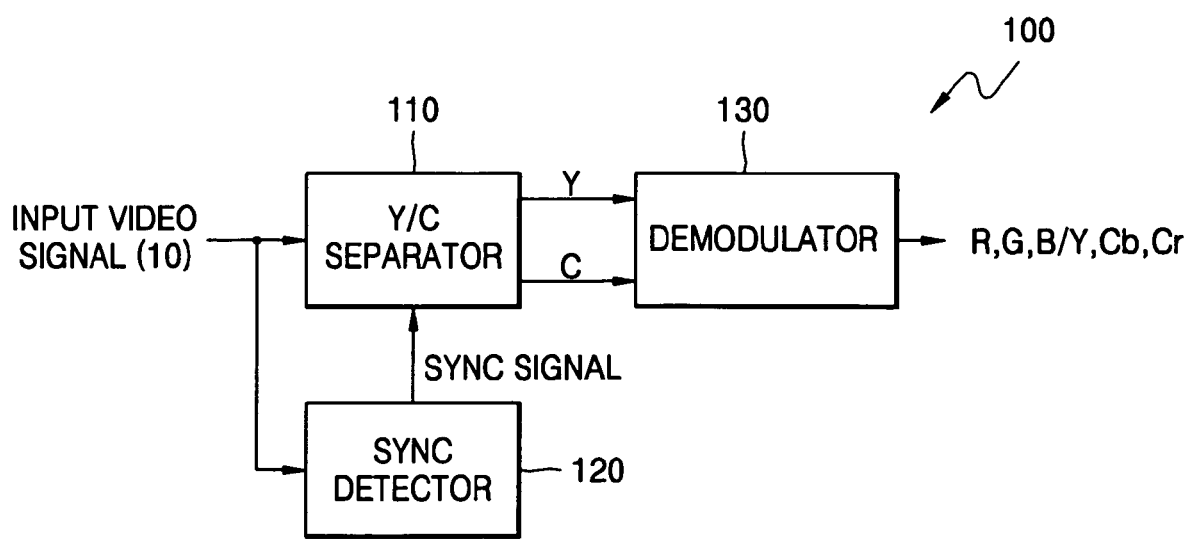
FIG. 2A is a high-level block diagram of a conventional video signal processing system.
Figure 2B:
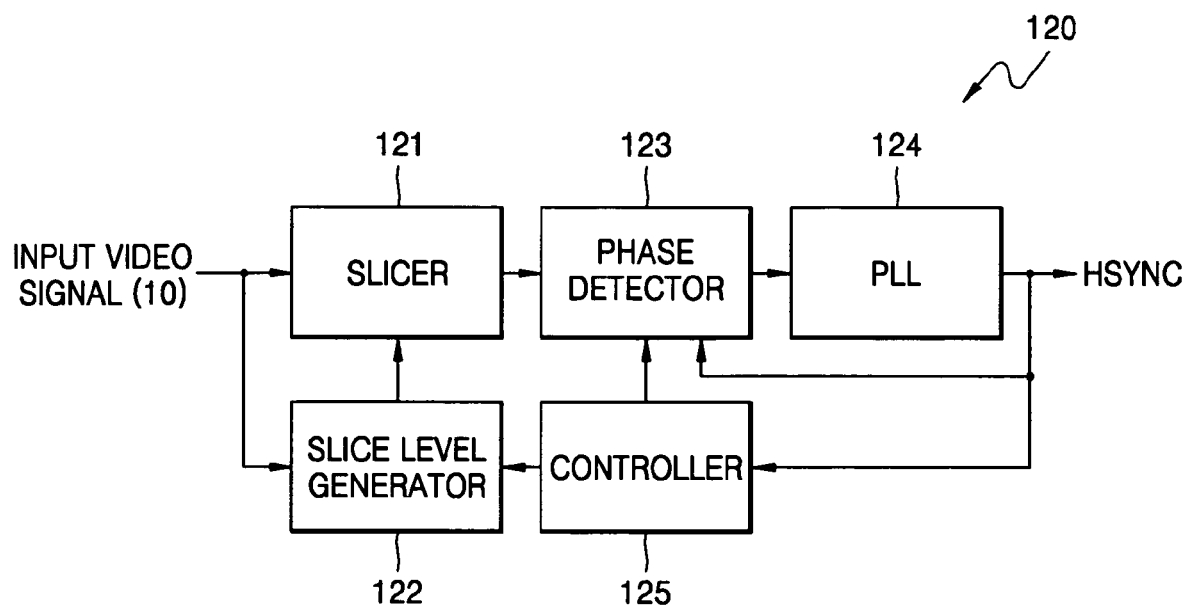
FIG. 2B is a high-level block diagram of a conventional Hsync detection system, which can be implemented in the system of FIG. 2A.

The ADC (210) receives an analog video signal (40) as input and converts the analog signal to a digital video signal using known techniques. FIG. 4A illustrates an exemplary input analog input video signal (40) having a signal format similar to that of FIG. 1. In particular, the ADC (210) samples the input video signal (40) at discrete points in time according to a predetermined sampling frequency. The output of the ADC (210) is a digital stream of sample values representing the instantaneous voltage value of the input analog video signal (40) at each sampling position.

Figure 4:
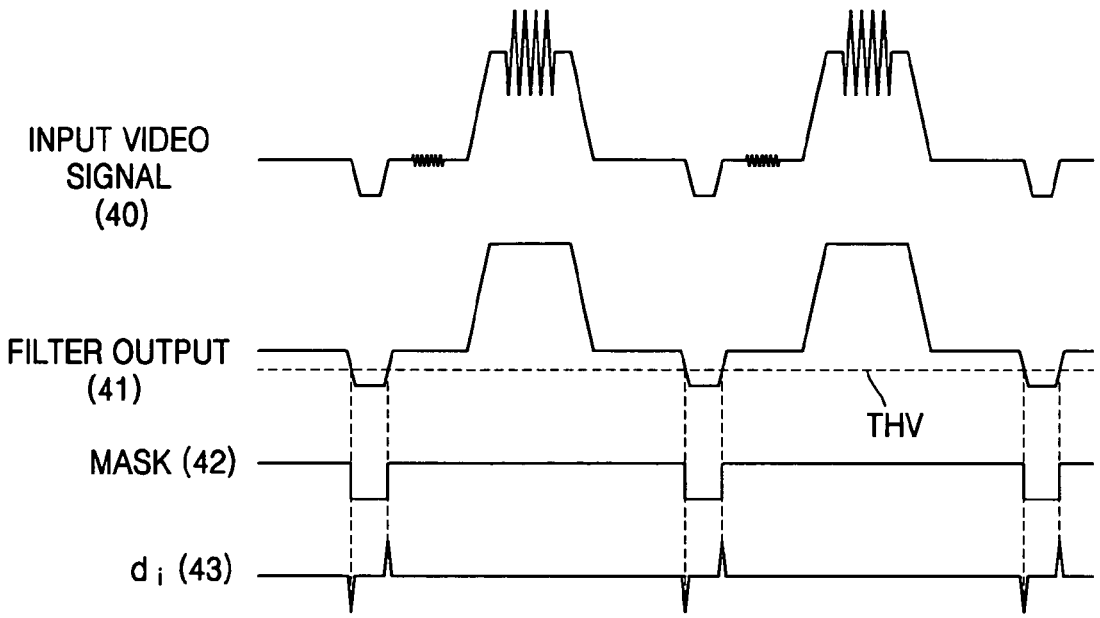
FIG. 4 is a waveform diagram illustrating an exemplary mode of operation of the Hsync detection system of FIG. 3.

The filter (220) is a digital low-pass filter that may be implemented to filter the digital video signal output from the ADC (210) for the purpose of eliminating noise and/or color information signals if the input analog video signal is of a CVBS format, for example. For instance, as depicted in FIG. 4, a filter output signal (41) is depicted, which is similar in shape to the input video signal (40) but where the high frequency color signals on the back porch and active video portions are removed.

The Sync detector (240) processes the filter output signal (41) using a mask signal (42) generated by the mask generator (230) to determine the position of the Hsync signals (referred to as HSP, or horizontal sync position), as well as determine (or otherwise estimate) a current Sync level (SL) and blanking level (BL). The Sync detector (240) generates dynamics di (43), which represents a rate of change of the level of the filtered digital video signal (41). The Sync detector (240) utilizes the dynamics (43) and the estimated SL, BL and HSP to determine (or otherwise estimate) a threshold voltage (THV) (or slice level) which is input in feedback to the mask generator (230). In one exemplary embodiment, the Sync detector (240) dynamically determines current values for SL, BL, HSP, and THV on a continuing basis, wherein the current values can be determined based on a weighted measure of instantaneous values and one or more previously determined values. An exemplary embodiment of the HSync detector (240) will be described in more detail in connection with FIG. 6.

The mask generator (230) receives the filter output signal (41) and estimate THV to generate the mask signal (42). In particular, the mask generator (230) uses the estimated THV (output from the Sync detector (240)) to determine the falling and rising edges of the Hsync pulses in the filter output signal (41) and generate a mask signal (42) containing a series of pulses that are aligned to the Hsync pulses in the filter output signal (41) as detected by the mask generator (230) using the THV level. The mask signal (42) is utilized by the Sync detector (240) for identifying sample points in the filter output signal (42) relevant for estimating SL, BL, HSP, etc.

Figure 6:
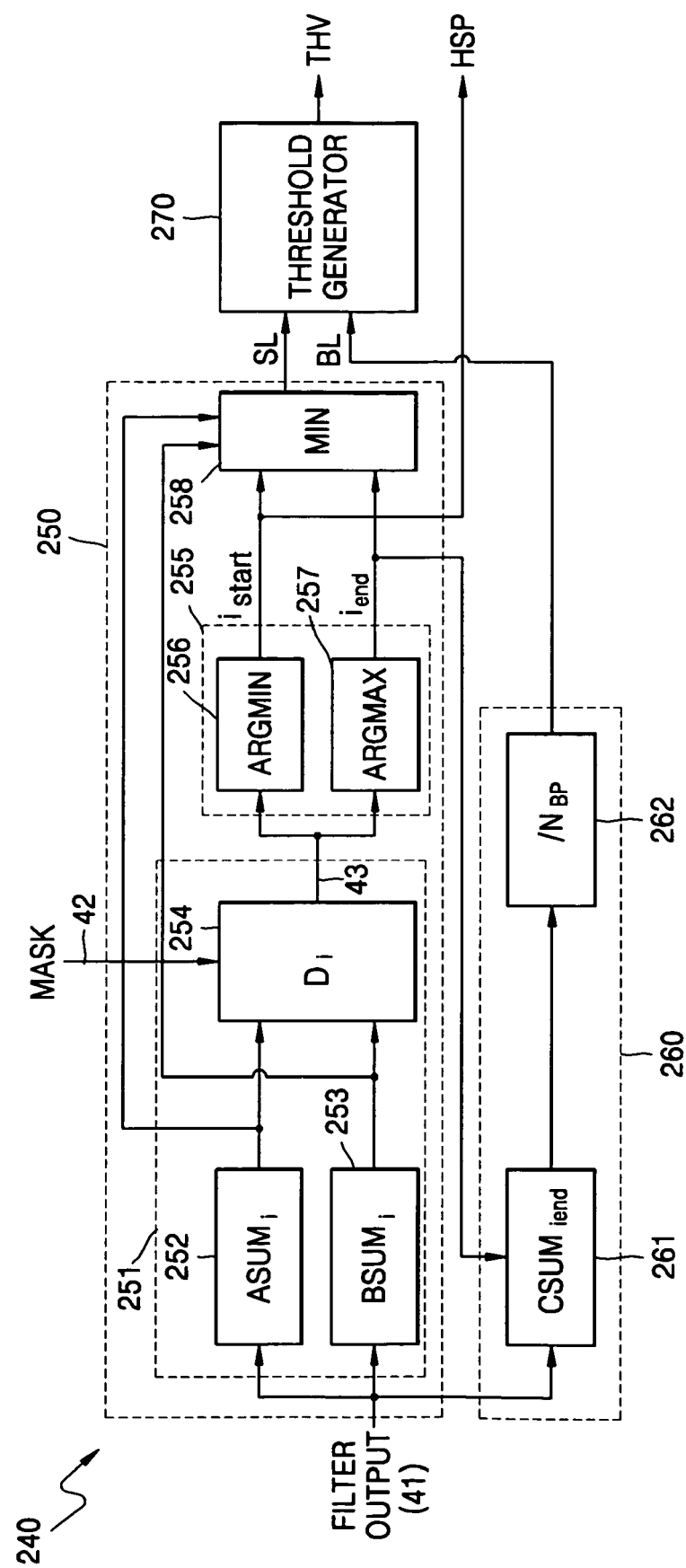
FIG. 6 is a block diagram illustrating an Hsync detector module according to an exemplary embodiment of the invention, which can be implemented in the exemplary detection system of FIG. 3.

FIG. 6 is a block diagram that illustrates an exemplary embodiment of the Sync detector module (240) of FIG. 3. In general, the Sync detector module (240) comprises a Sync level (SL) generator module (250), a blank level (BL) generator module (260) and a threshold voltage (THV) generator module (270). The SL generator (250) comprises a dynamics generator module (251) which includes first and second adders (252) and (253) and a dynamics (di) determiner module (254). As explained below, the dynamics generator module (251) is a digital FIR high pass filter that filters the filtered output signal (41) from the filter (220) (FIG. 3) in response to the mask signal (42) output from the mask generator (230) (FIG. 3) and outputs the dynamics (di) (43).

The SL generator (250) further comprises an Hsync position determination module (255) comprising argmin module (256) and argmax module (257). The Hsync position determination module (255) processes the high-pass filtered signal (i.e., dynamics (43)) output from the dynamics generator module (251) to determine a starting ($i_{start}$) and ending ($i_{end}$) position of Hsync signals.

The SL generator (250) further comprises an SL estimation module (258) for determining a current SL value based on an average of sample values in the sync space between the starting and ending positions of the currently detected Hsync, as output from the Hsync position determination module (255).

The blank level generator (260) comprises an adder (261) and a divider (262). The blank level generator (260) processes the digital filtered output signal (41) from the low pass filter (220) (FIG. 3) and estimates a current blank level BL using methods as described in further detail below.

The threshold generator module (270) receives the currently determined SL and BL values output from the SL generator module (250) and BL generator module (260), respectively, to determine a current THV (or slice level). The currently determined THV is fed back as input to the mask generator module (230) (FIG. 3) and used by the mask generator to generate the mask signal (43) pulses aligned to the rising/falling edges of the Hsync pulses in the filtered digital video signal as detected using the THV level. As will be explained below, a current THV can be determined based on a weighted measure of an actual current THV value and previously determined THV. In this manner, the system (240) can adaptively estimate a current THV based on current and historical data, which results in increased Hsync detection accuracy.

As noted above, the dynamics generator module (251) is essentially a digital high-pass filter that processes the digital video signal (41) output from the low pass filter (220) of FIG. 3. An exemplary mode of operation of the dynamic generator module (251) will now be described in detail with reference to the exemplary diagrams of FIGS. 5 and 7, for example. For a current sample position i of the filtered digital video signal (41), the adder (252) will determine a sum of N sampled values before the current sample position i and the adder (253) will determine a sum of N sampled values after the current sample position i. This is graphically illustrated in FIG. 7, which depicts AN samples before and BN samples after a current sample position i.

The dynamics determination module (254) continually receives the outputs of adders (252) and (253). In addition, the mask signal (42) is continually input to the dynamics determination module (254). For each sample position i, the dynamics determination module (254) determines the dynamics d(i) at the sample position index i. In one exemplary embodiment, the dynamics d(i) at a current sample position index i is determined as:

$$d(i)=B\text{SUM}(i)-A\text{SUM}(i) \qquad (1)$$

It is to be understood that the filtering method of Equation 1 is a filtering method using a non-weighted, symmetrical function based on an equal number of samples N before and after the sampling position. In other embodiments, the filtering process (for determining the dynamics d(i)) can be based on any suitable filtering methods, for instance, a filtering function in which the current sample index is considered in the computation, and/or where different number of sample values are considered before and after a current sample position i, and/or where the filtering is based on a weighted function, etc.

Figure 5:
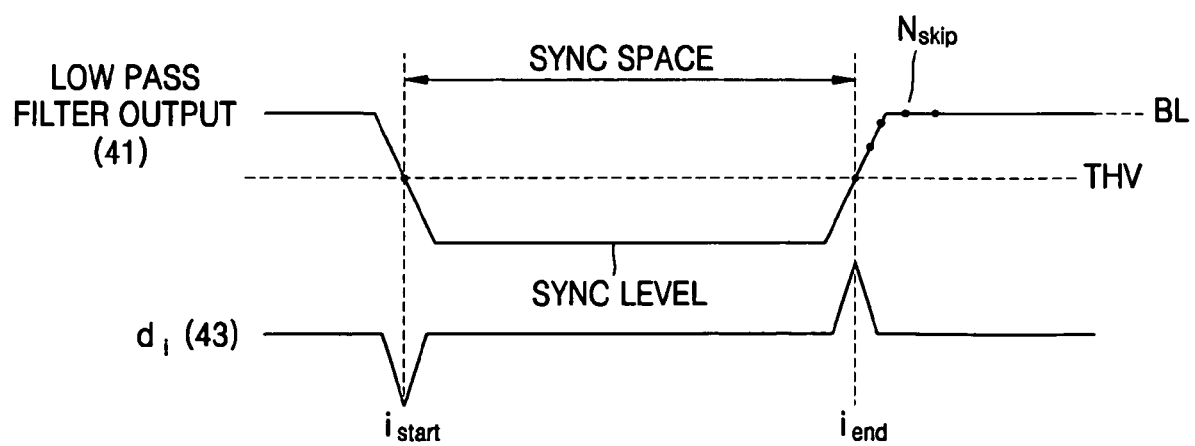
FIG. 5 is another waveform diagram illustrating an exemplary mode of operation of the Hsync detection system of FIG. 3.

The dynamics determination module (254) outputs the determined dynamics (43) to the Hsync position determination module (250). More specifically, in one exemplary embodiment, the dynamics determination module (254) utilizes the mask signal (42) to exclude the dynamics calculated for each sample position i of the filtered digital video signal (41) having a sample value that exceeds the threshold value TVH. In particular, the dynamics determination module (254) may output the dynamics di for each sample position i that falls within a "sync space" of a mask signal pulse as determined based on the THV level, such as depicted in FIG. 5.

The output of the dynamics determination module (254) is processed by the position determination module (255). In particular, for every horizontal scan period, the argmin module (256) determines a minimum position ($i_{start}$) from the values of the input dynamics d(i) as $i_{start}=\arg\min_i(di)$. Similarly, the argmax module (257) determines a maximum position ($i_{end}$) from the values of the input dynamics d(i) as $i_{end}=\arg\max_i(di)$. The dynamics d(i) will have a maximum value at the center of the rising edge adjacent to the sync level and a minimum value at the center of a falling edge in the vicinity of the sync level (see FIG. 5, for example). In one exemplary embodiment of the invention, the determined $i_{start}$ sample position is output as the HSP for a given horizontal scan period (although in another exemplary embodiment of the invention as discussed below with reference to FIG. 9, an interpolation process can be implemented to determine a more precise $i_{start}$ position.)

The SL determination module (258) receives as input, the output of the adders (252) and (253) and the argmin and argmax modules (256) and (257). The SL determination module (258) determines an average of 2N+1 values which are sampled over the low pass filter output at some sample position index between the determined minimum position $i_{start}$ and the maximum position $i_{end}$, and then estimates, as the SL, an average value at the position which the calculated average value is minimum. More specifically, in one exemplary embodiment of the invention, the SL determination module (258) determines SL as follows:

$$SL = \min_{j=i_{start},\ldots,i_{end}} \frac{ASUM_j + BSUM_j}{2N}. \qquad (2)$$

The BL generator (260) is essentially a low pass FIR filter that estimates the BL for every horizontal scan period by low-pass filtering the filter output signal (41) using the estimated $i_{end}$ position output from the argmax module (257). More specifically, in one exemplary embodiment, for each horizontal scan period, the adder (261) determines a sum of sample values in the back porch region of the filtered digital video signal (41), wherein the relevant samples considered are determined based on the maximum position $i_{end}$. The divider (262) determines an average by dividing the computed sum (output from adder (261)) by the sample number $N_{BP}$, wherein the BL is determined based on the average value. In particular, in one exemplary embodiment of the invention, BL is determined as: 2), etc., values. Moreover, an actual value for THV can be determined as THV=$(1-\alpha)$SL+ $\alpha$BL, where SL and BL are actual current values, with desired weights.

It is to be appreciated that the current values of SL and BL can be current determined values SL(i) and BL(i) based on a weighted measure of one or more previously determined values and an actual current value. For instance, a currently determined SL(i) and BL(i) can be computed as:

$$SL(i)=\alpha SL(i-1)+(1-\alpha)SL$$

$$BL(i)=\alpha BL(i-1)+(1-\alpha)BL$$

Figure 8:
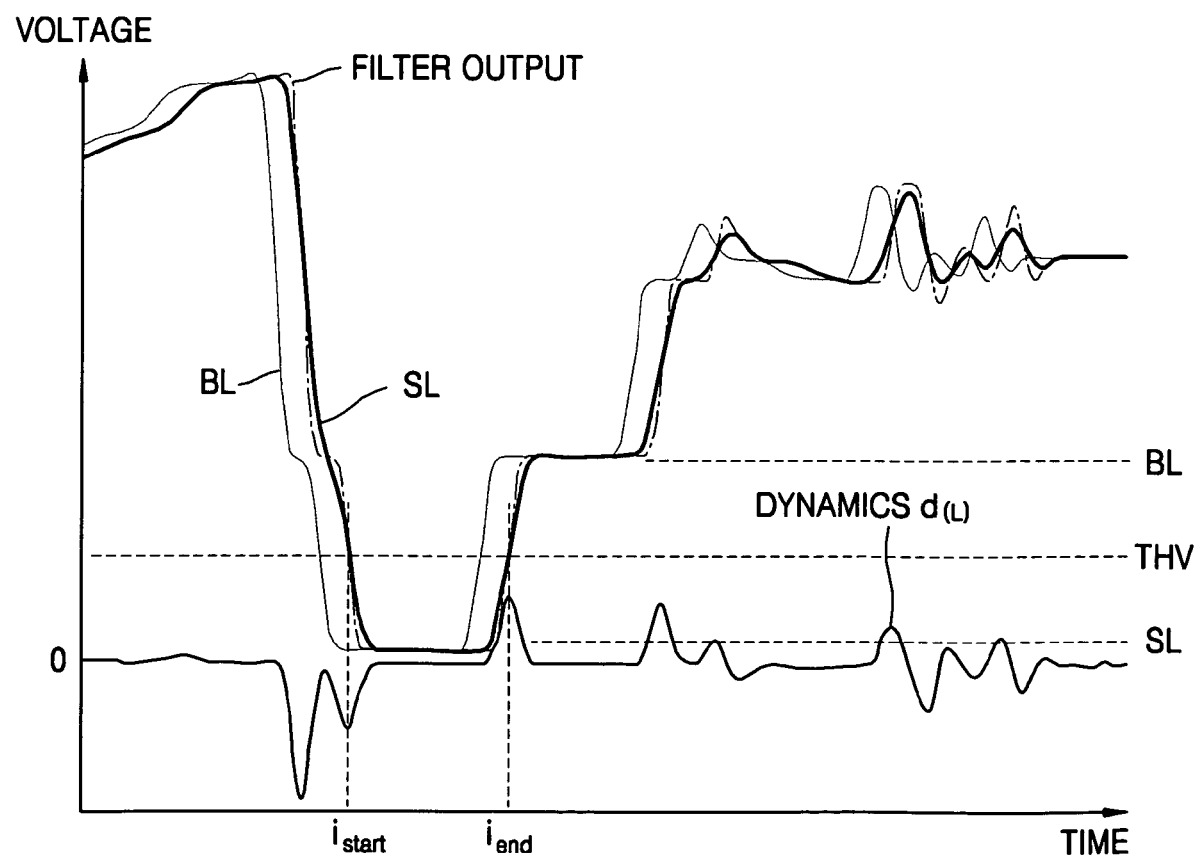
FIG. 8 is a waveform diagram that illustrates simulation results of video processing performed by the exemplary Hsync detector module of FIG. 6.

FIG. 8 a waveform diagram that illustrates simulation results of video processing performed by the exemplary Hsync detector module of FIG. 6. In the simulation, the dynamics d(i) for each index position was determined using N=12 samples before (AN__ and after (BN) a current index position i. In addition, to determine BL, $N_{SKIP}$=3 and C(N) was defined with N=15 samples following the $N_{SKIP}$ samples. In FIG. 8, the curve SL represents a waveform that traces the simulated sync level at each position using BSUMi and ASUMI. The curve BL represent a waveform that traces the simulated blank level using C(15). In addition, the curve labeled dynamics represent a simulated waveform determined using the above equation for d(i).

$$BL = \frac{CSUM_{iend}}{N_{BP}}. \qquad (3)$$

Figure 7:
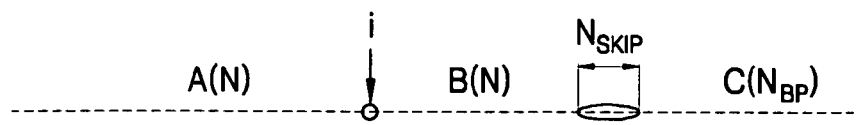
FIG. 7 is an exemplary diagram that schematically illustrates digital filtering operations implemented in the Hsync detector module of FIG. 6, according to exemplary embodiments of the invention.

To prevent sample values corresponding to the rising edge of the Hsync pulse from being included in the computation, a number of samples $N_{SKIP}$ following the determined maximum position $i_{end}$ can be excluded from the computation. For instance, as depicted in FIGS. 5 and 7, a given number of samples $N_{SKIP}$ following the estimated position $i_{end}$ are excluded from the set of samples $C(N_{BP})$ that are used for determining the BL value.

Figure 9:
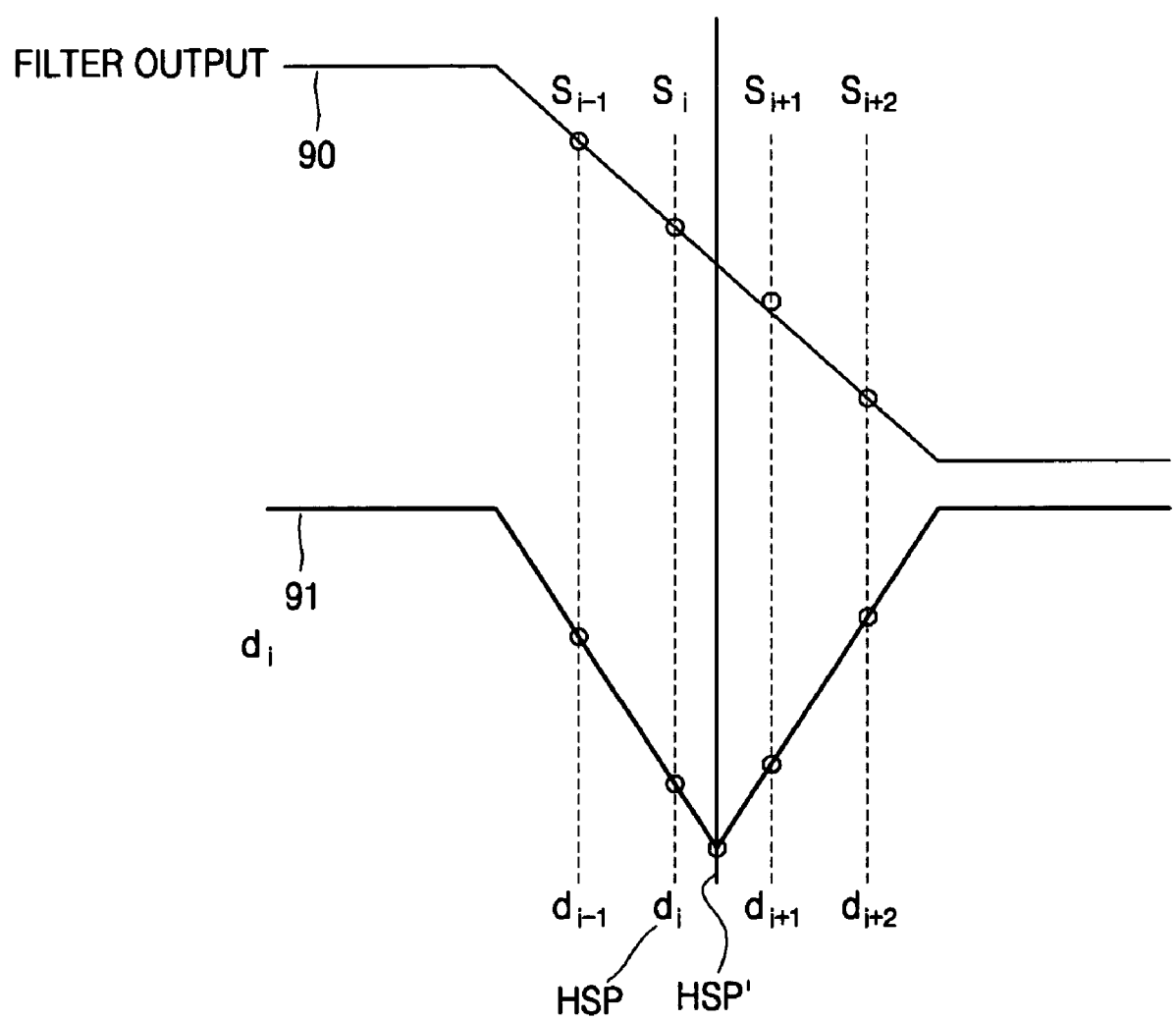
FIG. 9 schematically illustrates a method for adjusting an estimated Hsync position value, according to an exemplary embodiment of the invention.

As noted above, the threshold generator (270) estimates a current THV based on the estimate SL and BL values for the given scan period. In one exemplary embodiment of the invention, the threshold generator (270) determines a current THV(i) for a current-horizontal scan period as follows:

$$THV(i)=\alpha THV(i-1)+(1-\alpha)THV \qquad (4),$$

wherein THV(i−1) denotes a previously determined THV for a previous scan period, wherein THV denotes an actual (instantaneous) value for THV (as determined based on a current SL and BL value), and wherein $\alpha$=0, . . . , 1 denotes a weight parameter. In particular, the current THV(i) can be determined based on a weighted measure of an actual value for THV and one or more previously computed THV(i−1), THV (i−2), In another exemplary embodiment of the invention, a method can be implemented to adjust an estimated HSP ($i_{start}$) to determine an actual or more accurate HSP' value. An exemplary method for adjusting an estimated HSP value will be described with reference to FIG. 9. In FIG. 9, an exemplary waveform (90) represents a filter output signal with sampling positions . . . S(i−1),S(i),S(i+1),S(i+2) . . . , along a falling edge of a synch signal. In addition, an exemplary waveform (91) represents the dynamics d(i−1),d(i),d(i+1),d(i+2) computed for the corresponding sample positions of the filter output waveform (90). Since the dynamics (di) are estimated from the sample values of the filtered output signal (41), there is a possibility that the actual HSP' values of the dynamics (di) will not be sampled.

Accordingly, in one exemplary embodiment of the invention, an adjusted start position can be determined by interpolating the high-pass filtered digital video signal in an interval of samples including the determined start position $i_{start}$. More specifically, in the exemplary diagram of FIG. 9, assuming that sampling position S(i) is estimated as the minimum position (istart) from the dynamics d(i) and is thus determined as the HSP, the HSP can be adjusted to the intersection point HSP'. In one exemplary embodiment, HSP' can be computed as follows:

$$HSP' = i - 1 + \frac{3d_{i+1} - 2d_{i+2} - d_{i-1}}{d_i - d_{i-1} - d_{i+1} - d_{i+2}}.$$

In the exemplary embodiment of FIG. 6, position determination module (255) can implement an exemplary HSP adjustment method as described above, and then output the adjusted $i_{start}$ position as the true HSP.

Although exemplary embodiments have been described herein with reference to the accompanying drawings, it is to be understood that the invention is not limited to the exemplary embodiments described herein, and that various other changes and modifications may be readily envisioned by one of ordinary skill in the art without departing form the scope or spirit of the invention. All such changes and modifications are intended to be included within the scope of the invention as defined by the appended claims.

We claim:

1. A method for determining a position of the horizontal sync signal using a signal processor, the method comprising:
   receiving an analog video signal comprising a horizontal sync signal;
   converting the analog video signal to a digital video signal;
   low-pass filtering the digital video signal to generate a first filtered digital video signal;

determining a rate of variation di of the first filtered digital video signal at each sample position i; and
determining the position of the horizontal sync signal based on the rate of variation di using the signal processor;
wherein determining the position of the horizontal sync signal comprises:
generating a masking signal indicating an estimated interval of the horizontal sync signal using the first filtered video signal; and
determining a start position $i_{start}$ and end position $i_{end}$ of the horizontal sync signal using the masking signal and the rate of variation di;
wherein the rate of variation di is determined in response to the masking signal.

2. The method of claim 1, further comprising estimating a sync level (SL) of the horizontal sync signal using the first filtered digital video signal and the determined position of the horizontal sync signal.

3. The method of claim 2, further comprising estimating a blank level (BL) of the analog video signal using the first filtered digital video signal and the determined position of the horizontal sync signal.

4. The method of claim 3, further comprising estimating a threshold value (THV) using the estimated SL and BL.

5. The method of claim 4, further comprising using the estimated THV for determining the position of the horizontal sync signal.

6. The method of claim 1, further comprising determining an adjusted start position by interpolating the second filtered digital video signal in an interval of samples including the determined start position $i_{start}$.

7. The method of claim 1, further comprising:
estimating a threshold value (THV); and
using the estimated THV to determine the position of the horizontal sync signal.

8. The method of claim 7, wherein estimating the THV comprises:
estimating a sync level (SL) of the horizontal sync signal using the first filtered digital video signal and the determined position of the horizontal sync signal;
estimating a blank level (BL) of the analog video signal using the first filtered digital video signal and the determined position of the horizontal sync signal; and
estimating the THV of the horizontal sync signal using the estimated SL and BL.

9. The method of claim 8, wherein estimating the SL comprises:
determining an average of sample values of the first filtered digital video signal within each of a plurality of sample intervals between the start position $i_{start}$ and end position iend of the horizontal sync signal;
determining one of the plurality of sample intervals having a minimum average value; and
outputting the minimum average value as the SL.

10. The method of claim 8, wherein estimating the BL comprises:
determining an average of N sample values in a back porch region of the first filtered digital video signal after the determined end position tend of the horizontal sync signal; and
outputting said average of N sample values as the estimated BL.

11. The method of claim 10, further comprising excluding a plurality of sample values immediately following the determined end position $i_{end}$ from said BL estimating step.

12. A method for determining a position of the horizontal sync signal using a signal processor, the method comprising:
receiving an analog video signal comprising a horizontal sync signal;
converting the analog video signal to a digital video signal;
low-pass filtering the digital video signal to generate a first filtered digital video signal;
determining a rate of variation di of the first filtered digital video signal at each sample position i; and
determining the position of the horizontal sync signal based on the rate of variation di using the signal processor;
wherein determining a rate of variation di comprises:
for each sample position i,
determining a first weighted sum of N sample values after the sample position;
determining a second weighted sum of M sample values before the sample position; and
determining a difference between said second and said first weighted sums.

13. The method of claim 12, wherein N and M are integer values that are not equal.

14. A program storage device readable by a processor, tangibly embodying a program of instructions executable by the processor to perform method steps for determining a position of the horizontal sync signal, the method steps comprising:
receiving the analog video signal comprising a horizontal sync signal;
converting the analog video signal to a digital video signal;
low-pass filtering the digital video signal to generate a first filtered digital video signal;
determining a rate of variation of di of the first filtered digital video signal at each sample position i; and
determining the position of the horizontal sync signal based on the rate of variation di;
wherein the program instructions for determining the position of the horizontal sync signal comprise program instructions for:
generating a masking signal indicating an estimated interval of the horizontal sync signal using the first filtered video signal; and
determining a start position $i_{start}$ and end position $i_{end}$ of the horizontal sync signal using the masking signal and the rate of variation di;
wherein the rate of variation di is determined in response to the masking signal.

15. The program storage device of claim 14, further comprising program instructions for estimating a sync level (SL) of the horizontal sync signal using the first filtered digital video signal and the determined position of the horizontal sync signal.

16. The program storage device of claim 15, further comprising program instructions for estimating a blank level (BL) of the analog video signal using the first filtered digital video signal and the determined position of the horizontal sync signal.

17. The program storage device of claim 16, further comprising program instructions for estimating a threshold value (THV) using the estimated SL and BL.

18. The program storage device of claim 17, further comprising program instructions for using the estimated THV for determining the position of the horizontal sync signal.

19. The program storage device of claim 14, further comprising program instructions for determining an adjusted start position by interpolating the second filtered digital video signal in an interval of samples including the determined start position $i_{start}$.

20. The program storage device of claim 14, further comprising program instructions for:
   estimating a threshold value (THV); and
   using the estimated THV to determine the position of the horizontal sync signal.

21. The program. storage device of claim 20, wherein the program instruction for estimating the THV comprise program instructions for:
   estimating a sync level (SL) of the horizontal sync signal using the first filtered digital video signal and the determined position of the horizontal sync signal;
   estimating a blank level (BL) of the analog video signal using the first filtered digital video signal and the determined position of the horizontal sync signal; and
   estimating the THV of the horizontal sync signal using the estimated SL and BL.

22. The program storage device of claim 21, wherein the program instructions for estimating the SL comprise program instructions for:
   determining an average of sample values of the first filtered digital video signal within each of a plurality of sample intervals between the start position $i_{start}$ and end position iend of the horizontal sync signal;
   determining one of the plurality of sample intervals having a minimum average value; and
   outputting the minimum average value as the SL.

23. The program storage device of claim 21, wherein the program instructions for estimating the BL comprise program instructions for:
   determining an average of N sample values in a back porch region of the first filtered digital video signal after the determined end position $i_{end}$ of the horizontal sync signal; and
   outputting said average of N sample values as the estimated BL.

24. The program storage device of claim 23, further comprising program instructions for excluding a plurality of sample values immediately following the determined end position $i_{end}$ from said BL estimating step.

25. A program storage device readable by a processor, tangibly embodying a program of instructions executable by the processor to perform method steps for determining a position of the horizontal sync signal, the method steps comprising:
   receiving the analog video signal comprising a horizontal sync signal;
   converting the analog video signal to a digital video signal;
   low-pass filtering the digital video signal to generate a first filtered digital video signal;
   determining a rate of variation of di of the first filtered digital video signal at each sample position i; and
   determining the position of the horizontal sync signal based on the rate of variation di;
   wherein the program instructions for determining a rate of variation di comprise program instructions for:
   for each sample position i,
      determining a first weighted sum of N sample values after the sample position;
      determining a second weighted sum of M sample values before the sample position; and
      determining a difference between said second and said first weighted sums.

26. The program storage device of claim 25, wherein N and M are integer values that are not equal.

* * * * *